United States Patent
Lai

(10) Patent No.: US 10,461,451 B1
(45) Date of Patent: Oct. 29, 2019

(54) ELECTRONIC DEVICE QUICK RELEASE STRUCTURE

(71) Applicant: Aplex Technology Inc., New Taipei (TW)

(72) Inventor: Jui-Chieh Lai, New Taipei (TW)

(73) Assignee: Aplex Technology Inc., New Taipei (TW)

( * ) Notice: Subject to any disclaimer, the term of this patent is extended or adjusted under 35 U.S.C. 154(b) by 24 days.

(21) Appl. No.: 16/006,359

(22) Filed: Jun. 12, 2018

(51) Int. Cl.
| | |
|---|---|
| *H05K 1/00* | (2006.01) |
| *H01R 12/71* | (2011.01) |
| *H01R 13/633* | (2006.01) |
| *H01R 12/70* | (2011.01) |

(52) U.S. Cl.
CPC ....... *H01R 12/716* (2013.01); *H01R 12/7029* (2013.01); *H01R 13/6335* (2013.01)

(58) Field of Classification Search
CPC .............. H01R 12/716; H01R 12/7029; H01R 13/6335; H01R 13/639; H01R 13/6272; G06F 1/1632; G06F 1/181
USPC .............. 361/727, 686, 683, 679.41, 679.43, 361/679.58; 439/74, 928, 347, 352, 361
See application file for complete search history.

(56) References Cited

U.S. PATENT DOCUMENTS

| | | | | |
|---|---|---|---|---|
| 4,969,830 A * | 11/1990 | Daly | ..................... | G06F 1/1632 200/50.1 |
| 6,151,218 A * | 11/2000 | Pirdy | ..................... | G06F 1/1632 361/679.41 |
| 6,762,928 B2 * | 7/2004 | Lo | ..................... | E05B 17/0037 292/102 |
| 7,405,927 B2 * | 7/2008 | Lev | ..................... | E05C 19/163 292/121 |
| 8,414,037 B2 * | 4/2013 | Wang | ..................... | E05C 19/022 292/137 |
| 8,937,809 B2 * | 1/2015 | Fan | ..................... | H05K 5/02 248/121 |
| 2002/0131234 A1 * | 9/2002 | Sterner | ..................... | G06F 1/1632 361/679.41 |
| 2006/0170223 A1 * | 8/2006 | Homer | ..................... | E05B 65/006 292/102 |

* cited by examiner

*Primary Examiner* — Edwin A. Leon
*Assistant Examiner* — Milagros Jeancharles
(74) *Attorney, Agent, or Firm* — C. G. Mersereau; DeWitt LLP

(57) ABSTRACT

An electronic device quick release structure includes: a first carrier board having a first face, a second face and multiple first perforations, the first perforations being connected with the first and second faces; a second carrier board having a third face, a fourth face and multiple second perforations, the second perforations being connected with the third and fourth faces; at least one elastic member having a first end and a second end, the first end being connected with the second carrier board; and a connection member movably disposed on the fourth face and connected with second end of the elastic member. The connection member has hook sections and an operation section. Each hook section has a first guide wall, a second guide wall and a restriction notch. The hook section passes through the first and second perforations. The first and second carrier boards are inserted in the restriction notch.

10 Claims, 9 Drawing Sheets

ELECTRONIC DEVICE QUICK RELEASE STRUCTURE

BACKGROUND OF THE INVENTION

1. Field of the Invention

The present invention relates generally to a frame body mating structure applied to an electronic device, and more particularly to an electronic device quick release structure.

2. Description of the Related Art

Along with the development of computer sciences, computers have been widely applied in various fields such as biomedical, semiconductor and industrial fields.

In the field of industrial computers, it is often necessary to separate the computer screen from the computer mainframe and assemble the computer screen with the computer mainframe so as to upgrade or service the hardware equipment. There are many requirements for the connection, for example, secure plug-in of the connection ports.

It is a current manner to align two connection ports with each other and then use screws or the equivalent fixing members to fully secure two metal plates so as to truly tightly plug in the connection ports.

When it is necessary to separate the connection ports, the screws (or the equivalent fixing members) are first removed. Then the two connection ports are forcedly separated from each other. During this process, the separation travel length of the connection ports determines degree of difficulty of separation. The shorter the separation travel is, the easier the connection ports are to separate, that is, the lower the degree of difficulty of separation is. Reversely, the longer the separation travel is, the harder the connection ports are to separate, that is, the higher the degree of difficulty of separation is.

When separating the two connection ports and it is hard to extract out the connection ports, a user is used to shake the connection ports left and right to help in separating the connection ports. However, the connection ports have numerous metal pins so that when shaken left and right, the metal pins are quite apt to deform. This will lead to damage of the metal pins and malfunction of the connection ports.

It is therefore tried by the applicant to provide an electronic device quick release structure, which enables the connection ports to more quickly and conveniently separate from and connect with each other with less strength.

SUMMARY OF THE INVENTION

It is therefore a primary object of the present invention to provide an electronic device quick release structure including guide walls for pushing and moving two carrier boards of the electronic device, whereby the two carrier boards and the connection ports can be more quickly separated from each other with less strength.

To achieve the above and other objects, the electronic device quick release structure of the present invention includes: a first carrier board having a first face, a second face and multiple first perforations, the first perforations being connected with the first and second faces; a second carrier board having a third face, a fourth face and multiple second perforations, the second perforations being connected with the third and fourth faces; at least one elastic member having a first end and a second end, the first end being connected with the second carrier board; and a connection member movably disposed on the fourth face and connected with the second end of the elastic member. The connection member has multiple hook sections and an operation section. Each hook section has a first guide wall, a second guide wall and a restriction notch. The hook section correspondingly passes through the first and second perforations. The first and second carrier boards are inserted in the restriction notch. The second face of the first carrier board abuts against and connecting with the third face of the second carrier board. The operation section drives the connection section to reciprocally move. The first guide wall abuts against one end of the first perforation. The second guide wall abuts against the other end of the first perforation.

According to the above arrangement, the operation section serves to move the connection member, whereby the first guide wall or the second guide wall can push and move the first carrier board to separate the first and second carrier boards from each other or connect the first and second carrier boards with each other. Therefore, the first and second carrier boards can be more quickly separated from each other with less strength.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
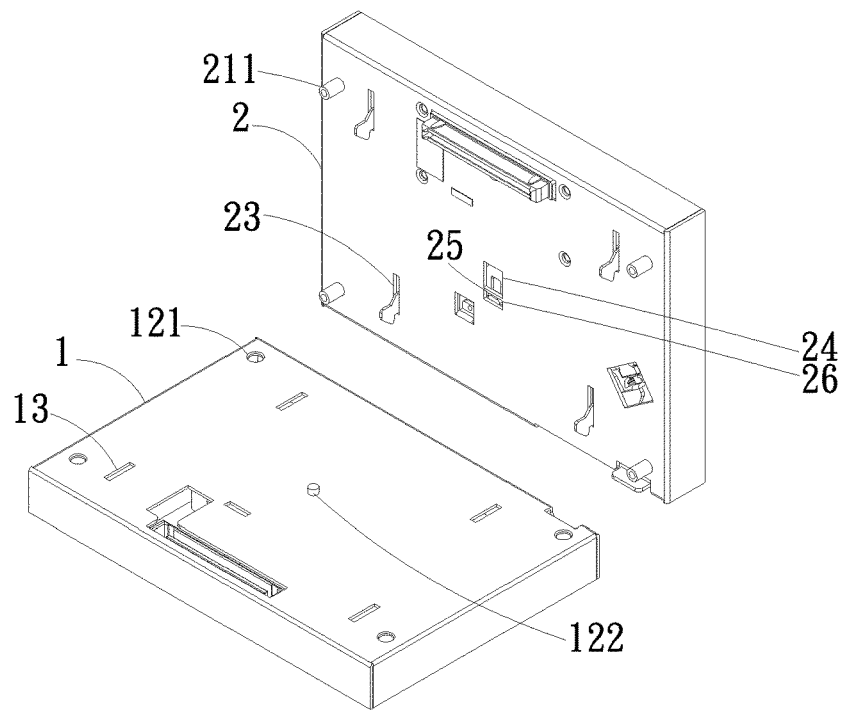
FIG. 1A is a perspective exploded view of a first embodiment of the present invention.
Figure 1B:
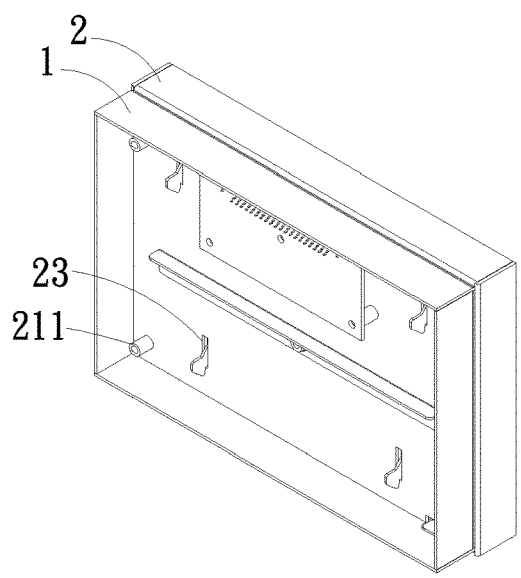
FIG. 1B is a perspective assembled view of the first embodiment of the present invention.
Figure 1C:
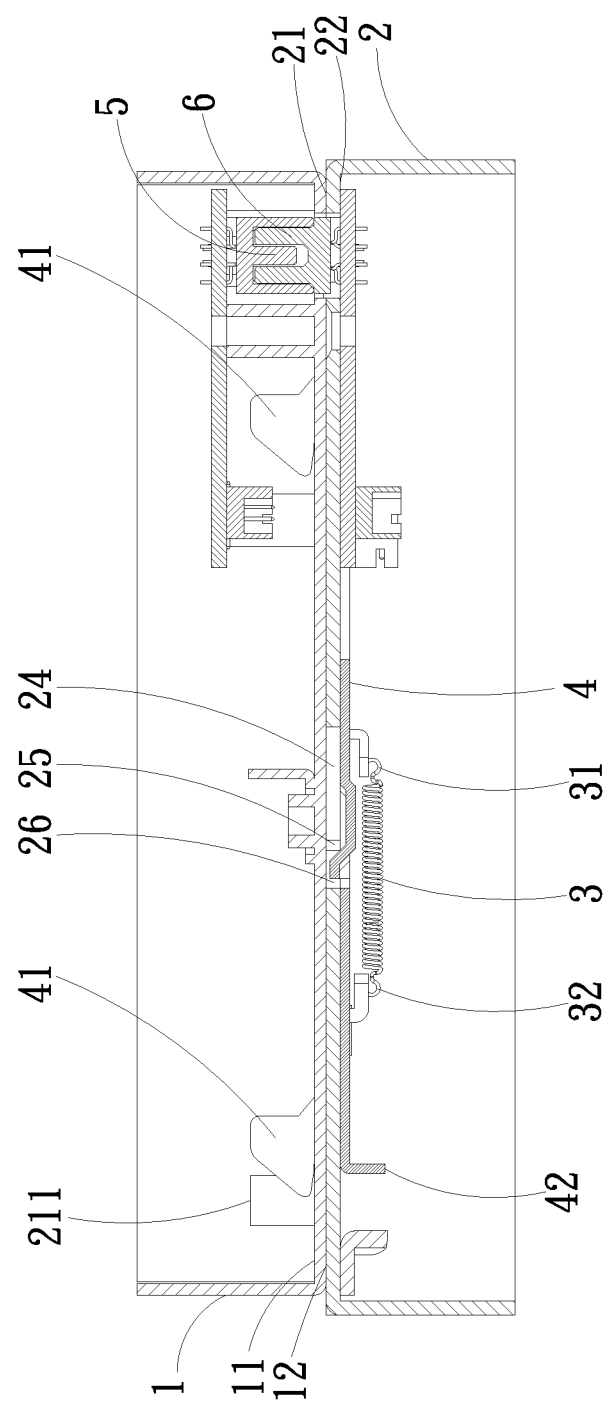
FIG. 1C is a sectional view of the first embodiment of the present invention.

Please refer to FIGS. 1A, 1B and 1C. FIG. 1A is a perspective exploded view of a first embodiment of the present invention. FIG. 1B is a perspective assembled view of the first embodiment of the present invention. FIG. 1C is a sectional view of the first embodiment of the present invention. According to the first embodiment, the electronic device quick release structure of the present invention includes a first carrier board 1, a second carrier board 2, an elastic member 3 and a connection member 4. A first connection port 5 is disposed on the first carrier board 1. A second connection port 6 is disposed on the second carrier board 2. The first and second carrier boards 1, 2 are mated and connected with each other with the first and second connection ports 5, 6 mated and connected with each other.

Figure 2A:
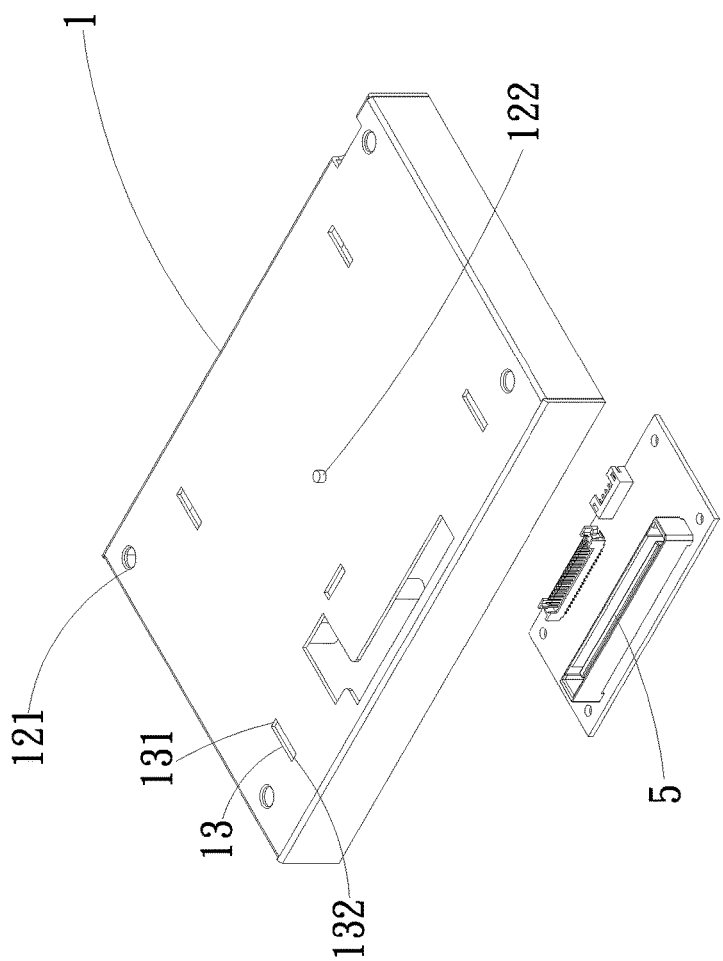
FIG. 2A is a perspective exploded view of the first carrier board of the present invention.
Figure 2B:
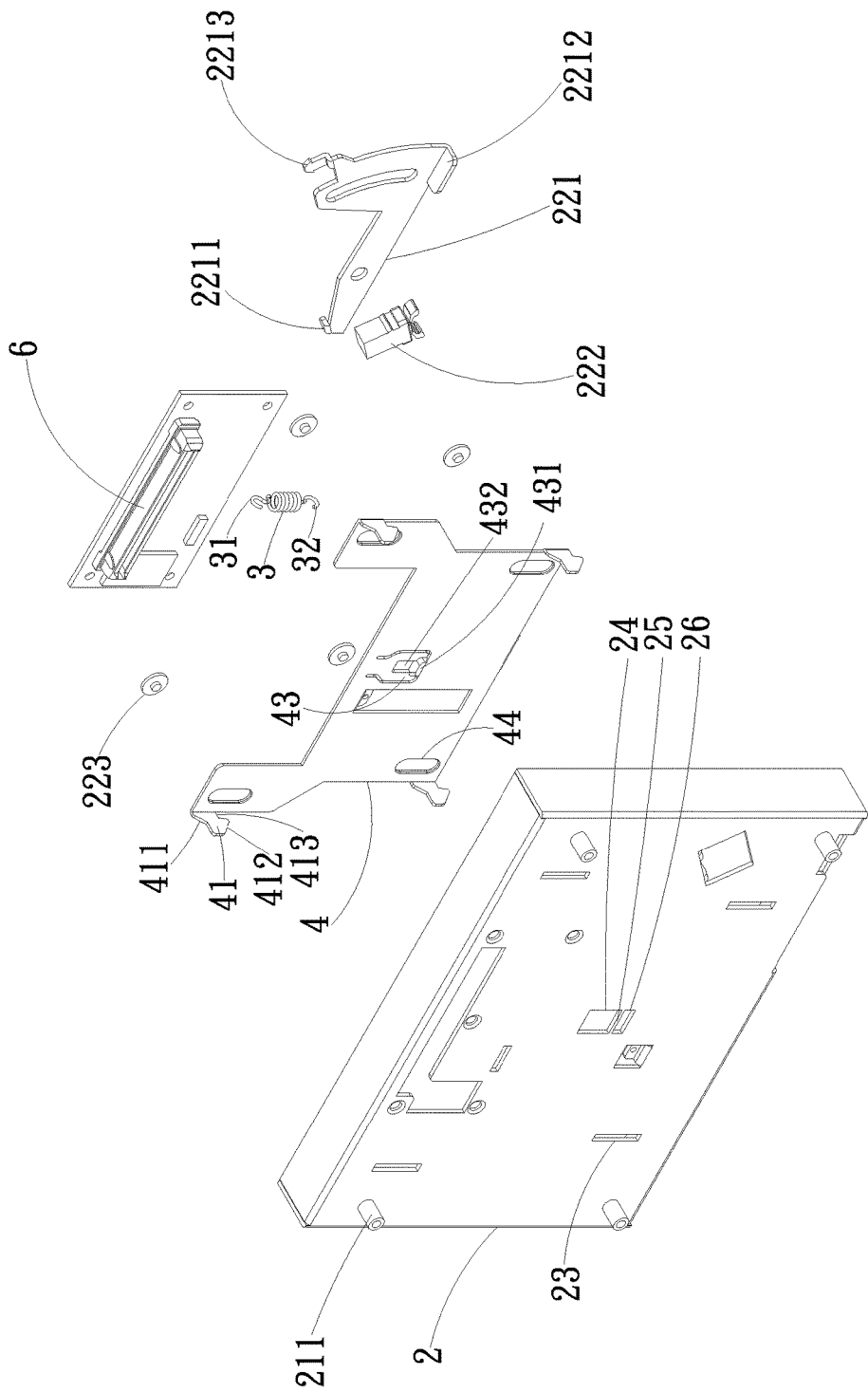
FIG. 2B is a perspective exploded view of the second carrier board of the present invention.
Figure 2C:
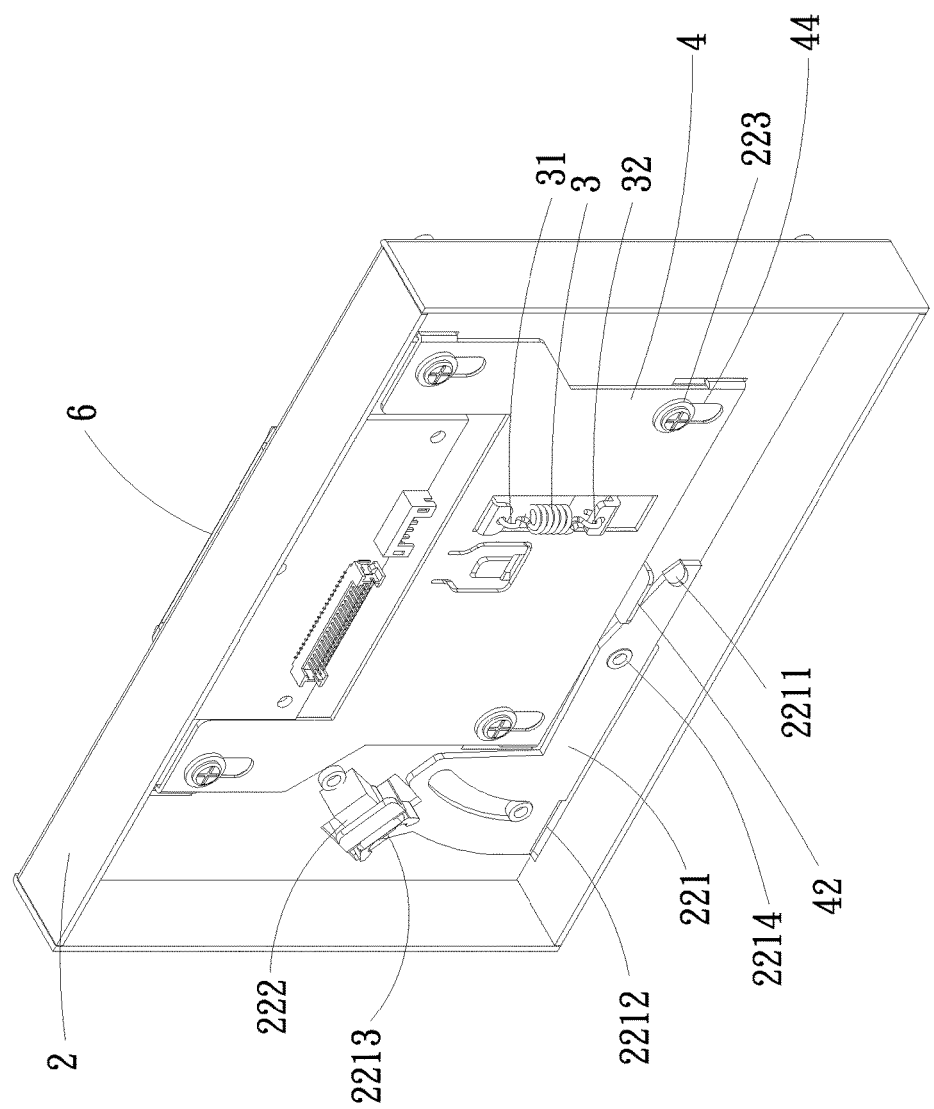
FIG. 2C is a perspective view of the second carrier board of the present invention.
Figure 2D:
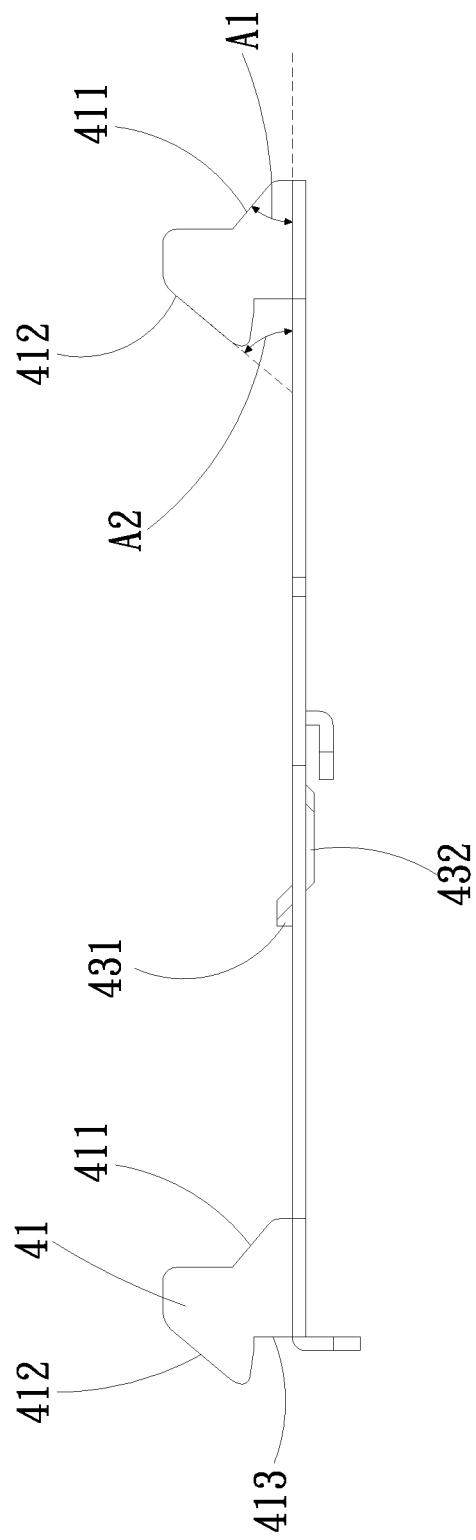
FIG. 2D is a side view of a part of the connection member of the present invention.

Please now refer to FIGS. 2A, 2B, 2C and 2D. FIG. 2A is a perspective exploded view of the first carrier board of the present invention. FIG. 2B is a perspective exploded view of the second carrier board of the present invention. FIG. 2C is a perspective view of the second carrier board of the present invention. FIG. 2D is a side view of a part of the connection member of the present invention. Also referring to FIGS. 1A, 1B and 1C, the first carrier board 1 has a first face 11, a second face 12 and multiple first perforations 13. The first and second faces 11, 12 are positioned on two opposite faces. The first perforations 13 are connected with the first and second faces 11, 12. The second face 12 has multiple locating holes 121 and at least one pre-pressing section 122. The first perforation 13 has a first peripheral wall 131 and a second peripheral wall 132. The first and second peripheral walls 131, 132 are positioned at two opposite ends. The locating hole 121 has, but not limited to, a circuit configuration. Alternatively, the locating hole 121 can have a quadrangular configuration, a polygonal configuration or a special configuration with directionality.

The second carrier board 2 has a third face 21, a fourth face 22, multiple second perforations 23, at least one first escape hole 24, a stop section 25 and a second escape hole 26. The third and fourth faces 21, 22 are positioned on two opposite faces. The second perforations 23 and the first and second escape holes 24, 26 are connected with the third and fourth faces 21, 22. The third face 21 has multiple locating sections 211. The fourth face 22 has an operation lever 221, a fixing section 222 and multiple restriction bolt members 223. The locating section 211 has, but not limited to, a cylindrical configuration corresponding to the locating hole 121. Alternatively, the locating section 211 can have a quadrangular configuration, a polygonal configuration or a special configuration with directionality.

The operation lever 221 includes an abutment end 2211, a handle end 2212 and a connected end 2213. The operation lever 221 is pivotally rotatably disposed on the fourth face 22. The connected end 2213 is mated and connected with the fixing section 222. A pivotal connection section 2214 is disposed on the operation lever 221 and the fourth face 22. The distance or length between the pivotal connection section 2214 and the abutment end 2211 is smaller than the length between the pivotal connection section 2214 and the handle end 2212. By means of the ratio of the length, the operation can be performed with less strength at higher efficiency.

The elastic member 3 has a first end 31 and a second end 32. The first and second ends 31, 32 are positioned at two opposite ends. The first end 31 is disposed on the second carrier board 2, while the second end 32 is disposed on the connection member 4.

The connection member 4 has multiple hook sections 41, an operation section 42, at least one pre-abutment section 43 and multiple slide slots 44. The connection member 4 is disposed on the fourth face 22 of the second carrier board 2. The restriction bolt members 223 pass through the slide slots 44, whereby the connection member 4 is linearly slidable on the fourth face 22 to make the operation section 42 into contact with the abutment end 2211. The hook section 41 has a first guide wall 411, a second guide wall 412 and a restriction notch 413. The first guide wall 411 and the connection member 4 contain a first angle A1 ranging from one degree to 89 degrees, preferably 45 degrees. The second guide wall 412 and the connection member 4 contain a second angle A2 ranging from one degree to 89 degrees, preferably 45 degrees. The value of the first angle A1 will affect the separation travel length, the separation height and the necessary application force. The value of the second angle A2 will affect the connection travel length, the connection height and the necessary application force. The pre-abutment section 43 has a first raised section 431 and a second raised section 432. The first raised section 431 protrudes in a direction to the fourth face 22. The second raised section 432 protrudes in a direction away from the fourth face 22. The second raised section 432 is selectively disposed in the first escape hole 24 or the second escape hole 26.

When the first and second carrier boards 1, 2 are mated with each other, the locating sections 211 and the locating holes 121 are aligned with each other and a force is applied to connect the first and second carrier boards 1, 2. By means of the locating sections 211 and the locating holes 121, it is ensured that the first connection port 5 and the second connection port 6 are perpendicularly connected.

When the first and second carrier boards 1, 2 are separated, a force is applied to the handle end 2212 of the operation lever 211 to pull the handle end 2212. At this time, in a leverage manner, the operation lever 221 pushes the operation section 42 of the connection member 4 to move the connection member 4 and separate the first and second carrier boards 1, 2 from each other. Also, the first connection port 5 and the second connection port 6 are perpendicularly separated from each other.

Figure 3:
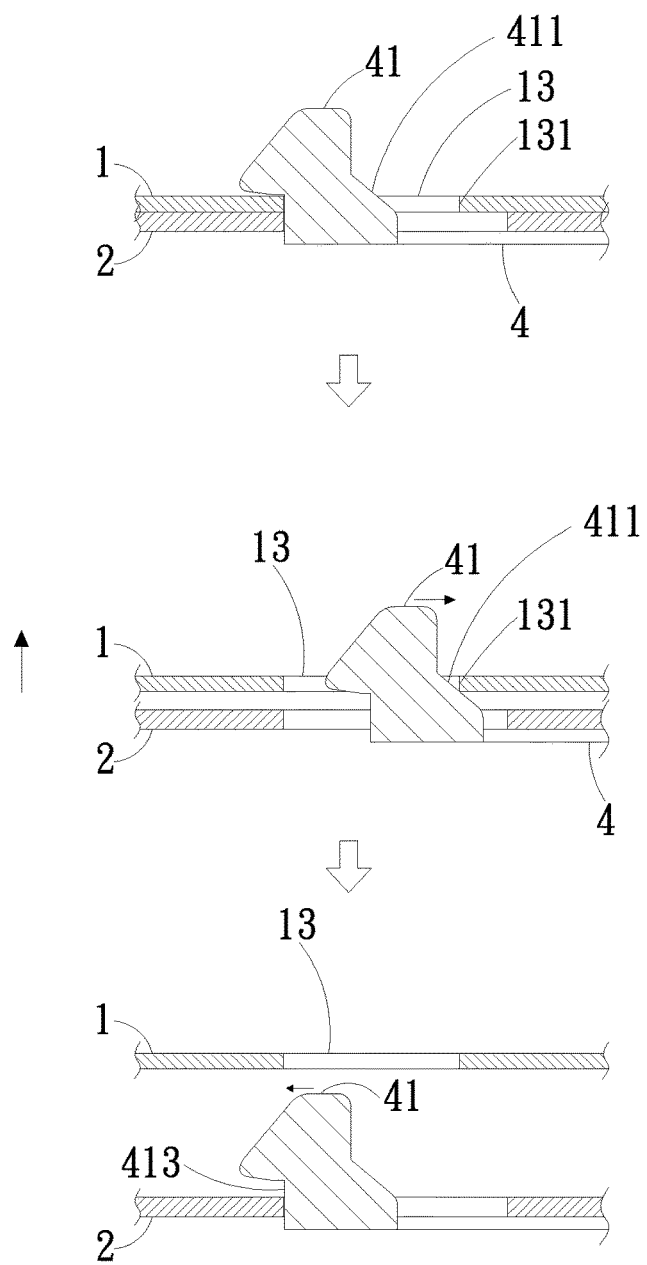
FIG. 3 is a view showing the separation travel of the present invention.

Please now refer to FIG. 3, which is a view showing the separation travel of the present invention. Also referring to FIGS. 1A, 1C, 2A, 2B and 2D, at the beginning, the first and second carrier boards 1, 2 are connected with through the restriction notch 413 of the connection member 4. When the connection member 4 linearly moves in a direction along the slide slot 44, the first guide wall 411 of the hook section 41 will contact the first peripheral wall 131 of the first perforation 13. At the same time, the first carrier board 1 is no longer fixed by the restriction notch 413, whereby the first carrier board 1 will linearly move upward in a direction along the locating hole 121 and the locating section 211. When fully separated, the connection member 4 will restore to its home position under the elastic force of the elastic member 3.

The smaller the first angle A1 is, the less the necessary force for moving the connection member 4 is. However, the necessary moving travel is longer and the up moving travel of the first carrier board 1 is shorter. Reversely, the larger the first angle A1 is, the greater the necessary force for moving the connection member 4 is. However, the moving travel is shorter and the up moving travel of the first carrier board 1 is longer. In this embodiment, 45 degrees is an optimal value in all situations. The first angle A1 can be designed according to the actual use requirement such as the factors of installation site of the electronic device, the connection depth of the first and second connection ports 5, 6, etc.

Figure 4:
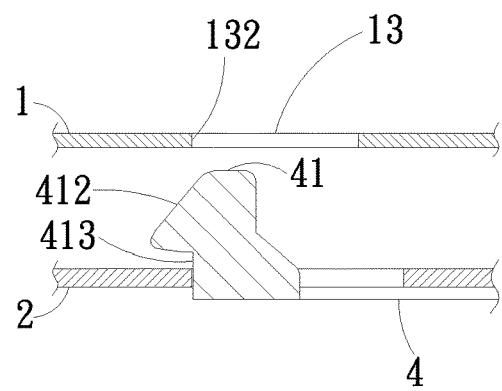
FIG. 4 is a view showing the connection travel of the present invention.
Figure 4:
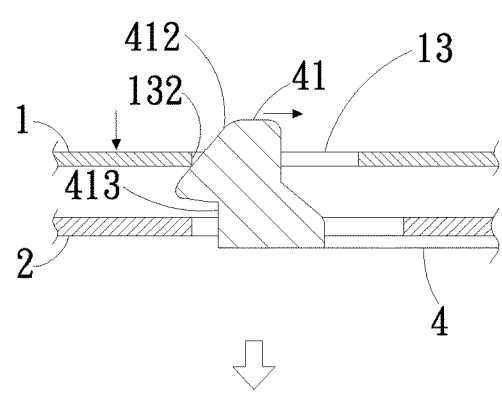
Figure 4:
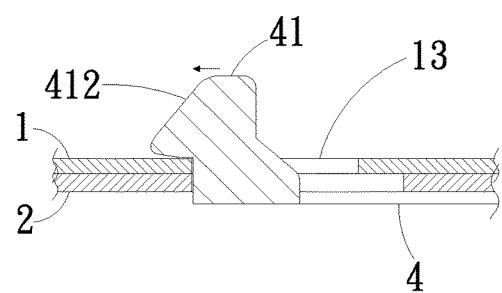

Please now refer to FIG. 4, which is a view showing the connection travel of the present invention. Also referring to FIGS. 1A, 1C, 2A and 2B, at the beginning, a force is applied to the first carrier board 1 in a direction to the second carrier board 2. The second peripheral wall 132 of the first perforation 13 will contact the second guide wall 412 of the hook section 41 to make the connection member 4 linearly move in a direction along the slide slot 44. When the second peripheral wall 132 passes through the crest point of the second guide wall 412, the first carrier board 1 will enter the restriction notch 413. When fully connected, the connection member 4 will restore to its home position under the elastic force of the elastic member 3.

The smaller the second angle A2 is, the less the necessary force for moving the connection member 4 is. However, the necessary moving travel is longer and the up moving travel of the first carrier board 1 is shorter. Reversely, the larger the second angle A2 is, the greater the necessary force for moving the connection member 4 is. However, the moving travel is shorter and the up moving travel of the first carrier board 1 is longer. In this embodiment, 45 degrees is an optimal value in all situations. The second angle A2 can be designed according to the actual use requirement such as the factors of installation site of the electronic device, the connection depth of the first and second connection ports 5, 6, etc.

In this embodiment, the optimal values of the first and second angles A1, A2 are both 45 degrees. However, in practice, the first and second angles A1, A2 can be otherwise designed according to different requirements.

For example, the first angle A1 can be 30 degrees and the second angle A2 can be 60 degrees. These values can freely substitute for each other.

Figure 5:
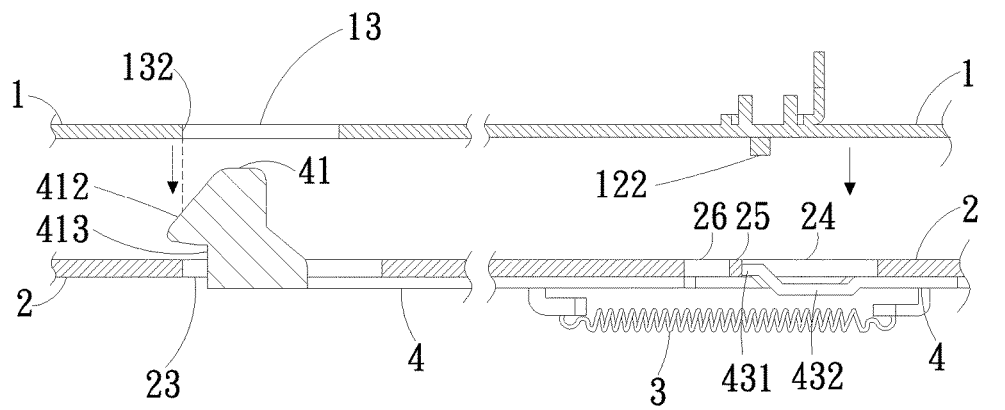
FIG. 5 is a view showing the operation of the pre-pressing section in the connection travel of the present invention.
Figure 5:
Figure 5:
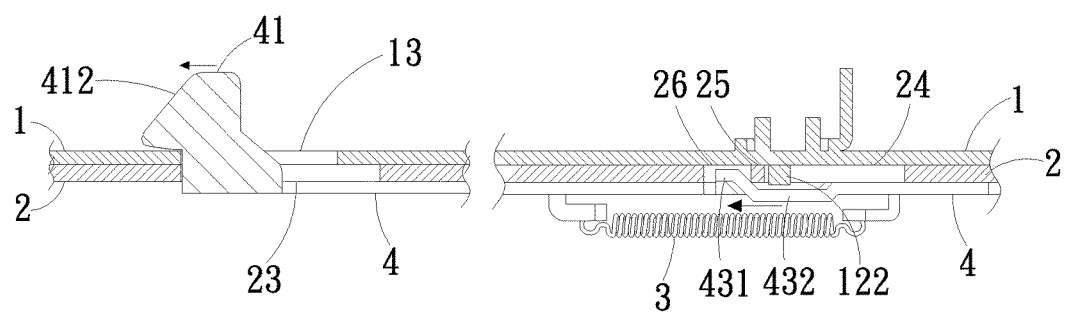

Please now refer to FIG. 5, which is a view showing the operation of the pre-pressing section in the connection travel of the present invention. Also referring to FIGS. 1C and 4, FIG. 4 shows the connection mode without pre-pressing assistance so that it is necessary for the connection member 4 to go through the entire travel. This will cost more time and strength to complete the connection. In the case that there is pre-pressing assistance, such situation can be improved. When the first carrier board 1 is separated, the connection member 4 restores to its home position under the elastic force of the elastic member 3 and the first raised section 431 of the pre-abutment section 43 will enter the first escape hole 24 into contact with the stop section 25. At this time, the hook section 41 is approximately positioned in the middle of the second perforation 23.

When the first carrier board 1 is pressed down to connect with the second carrier board 2, the second peripheral wall 132 will contact the middle section of the second guide wall 412 and start to press down. At the same time, the pre-pressing section 122 of the second face 12 pushes out the first raised section 431 from the first escape hole 24. When the second peripheral wall 132 passes through the crest point of the second guide wall 412, the first carrier board 1 will enter the restriction notch 413 and the first raised section 431 will enter the second escape hole 26, whereby the pre-pressing section 122 passes through the first escape hole 24 to be received in the second raised section 432.

That is, by means of the cooperation between the pre-abutment section 43, the pre-pressing section 122 and the stop section 25, the hook section 41 will not entirely restore to its home position. In this case, the connection travel of the connection member 4 is shortened so that the connection can be more quickly performed with less strength.

In conclusion, the present invention has the following advantages:
1. The connection and separation can be more quickly performed with less strength.
2. The present invention helps in separating and connecting the connection ports of the electronic device.
3. The alignment is precise and true.
4. By means of the operation lever, the separation can be more conveniently performed with less strength.
5. The appearance has high tidiness.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. An electronic device quick release structure comprising:
   a first carrier board having a first face, a second face and multiple first perforations, the first perforations being connected with the first and second faces;
   a second carrier board having a third face, a fourth face and multiple second perforations, the second perforations being connected with the third and fourth faces;
   at least one elastic member having a first end and a second end, the first end being connected with the second carrier board; and
   a connection member movably disposed on the fourth face and connected with the second end of the elastic member, the connection member having multiple hook sections and an operation section, each hook section having a first guide wall, a second guide wall and a restriction notch, the hook section correspondingly passing through the first and second perforations, the first and second carrier boards being inserted in the restriction notch, the second face of the first carrier board abutting against and connecting with the third face of the second carrier board, the operation section driving the connection section to reciprocally move, the first guide wall abutting against one end of the first perforation, the second guide wall abutting against the other end of the first perforation.

2. The electronic device quick release structure as claimed in claim 1, wherein the second face has multiple locating holes and the third face has multiple locating sections, the locating sections being connected with the locating holes.

3. The electronic device quick release structure as claimed in claim 1, wherein the second face has a pre-pressing section, the second carrier board having a first escape hole, a stop section and a second escape hole, the connection member having a pre-abutment section, the pre-pressing section abutting against the pre-abutment section, the pre-abutment section being raised and selectively disposed in the first escape hole or the second escape hole.

4. The electronic device quick release structure as claimed in claim 3, wherein the pre-abutment section includes a first raised section and a second raised section, the first raised section protruding in a direction to the fourth face, the second raised section protruding in a direction away from the fourth face.

5. The electronic device quick release structure as claimed in claim 1, wherein the first perforation has a first peripheral wall and a second peripheral wall distal from the first peripheral wall, the first guide wall abutting against the first peripheral wall, the second guide wall abutting against the second peripheral wall.

6. The electronic device quick release structure as claimed in claim 1, wherein the first guide wall and the connection member contain a first angle ranging from one degree to 89 degrees, preferably 45 degrees.

7. The electronic device quick release structure as claimed in claim 1, wherein the second guide wall and the connection member contain a second angle ranging from one degree to 89 degrees, preferably 45 degrees.

8. The electronic device quick release structure as claimed in claim 1, wherein an operation lever is pivotally disposed on the fourth face of the second carrier board, the operation lever having an abutment end and handle end, the abutment end being in contact with the operation section, the handle end being normal to the fourth face.

9. The electronic device quick release structure as claimed in claim 8, wherein a fixing section is further disposed on the fourth face and the operation lever further has a connected end, the fixing section being connected with the connected end.

10. The electronic device quick release structure as claimed in claim 1, wherein the connection member has multiple slide slots and the fourth face has multiple restriction bolt members, the restriction bolt members passing through the slide slots.

\* \* \* \* \*